United States Patent [19]

Jeong et al.

[11] Patent Number: 5,592,827
[45] Date of Patent: Jan. 14, 1997

[54] TEMPERATURE CONTROLLING METHOD OF REFRIGERATOR USING MICROPROCESSOR

[75] Inventors: Seong-wook Jeong, Suwon; Jae-in Kim, Seoul; Yun-seog Kang, Suwon, all of Rep. of Korea

[73] Assignee: Samsung Electronics Co. Ltd., Kyungki-do, Rep. of Korea

[21] Appl. No.: 563,927

[22] Filed: Nov. 29, 1995

[30] Foreign Application Priority Data

Nov. 30, 1994 [KR] Rep. of Korea ............... 94-32114

[51] Int. Cl.$^6$ ............... G01K 7/00; G05D 15/00
[52] U.S. Cl. ............... 62/229; 236/78 D; 374/170; 374/25
[58] Field of Search ............... 236/678 D; 62/229; 374/170; 377/25; 364/557

[56] References Cited

U.S. PATENT DOCUMENTS 5,388,134  2/1995  Douglass et al. ............... 374/170 X
5,513,235  4/1996  Douglass et al. ............... 377/25

*Primary Examiner*—William E. Wayner
*Attorney, Agent, or Firm*—Burns, Doane, Swecker & Mathis LLP

[57] ABSTRACT

A temperature controlling method of a refrigerator by using a microprocessor includes the steps of: sampling digitized temperature values counted by an analog-to-digital converter according to a predetermined temperature range by a predetermined frequency by using the microprocessor; when the number (X') of a temperature value (X) counted with the most frequency is not less than a desired frequency, selecting the temperature value with the most frequency as a controlling temperature; when the number (X') of the temperature value (X) counted with the most frequency is less than the desired frequency, selecting a value obtained by adding/subtracting a predetermined temperature value which is less than the predetermined temperature range to/from the temperature value (X) with the most frequency as the controlling temperature; and selecting a temperature value obtained by applying the steps to at least two temperature values (Y) (Z) counted with the second most frequency and the third most frequency, as the controlling temperature. Quantitative sampling is carried out on the temperature value less than resolving power of a microprocessor, and a controlling temperature value is then obtained from the sampled value and used for controlling the inner temperature of the refrigerator, so that the inner temperature can be maintained in the optimal condition.

5 Claims, 2 Drawing Sheets

TEMPERATURE CONTROLLING METHOD OF REFRIGERATOR USING MICROPROCESSOR

BACKGROUND OF THE INVENTION

The present invention relates to a temperature controlling method of a refrigerator using a microprocessor, and more particularly, to such a method which can optimally maintain a preset refrigeration temperature by precisely and quantitatively controlling the temperature.

Refrigerators are typically provided with plural thermostats, e.g., a freezer thermostat and a damper thermostat, for properly maintaining the inner temperature thereof. Here, the freezer thermostat is for automatically controlling the inner temperature of a freezer to which it is mounted, while the damper thermostat is for automatically controlling the inner temperature of a cold-storage compartment to which it is mounted. Such a refrigerator also has an evaporator and a bimetal thermostat for detecting a temperature increase of the evaporator when frost has been removed by a defrosting heater, is mounted to the evaporator in order to stop the operation of the defrosting heater.

FIG. 1 is a sectional side view showing the interior of a conventional refrigerator 10.

Referring to FIG. 1, a freezer 11, a cold-storage compartment 12 and a crisper 13 are provided in refrigerator 10. Here, freezer 11 and crisper 13 are typically located in the uppermost and lowermost portions of the refrigerator, respectively, with the cold-storage compartment 12 occupying the midsection thereof. Each compartment has its own door 11d, 12d and 13d, respectively. An evaporator 14 for absorbing heat of the inside of the refrigerator and thus cooling air inside the refrigerator while evaporating an influent liquid refrigerant at a low temperature is mounted to a wall (not shown) which separates freezer 11 and cold-storage compartment 12. A cooling fan 15 for circulating cool air by forcibly convecting the cool air is mounted behind evaporator 14. A freezer thermostat 16 for automatically controlling the temperature of freezer 11 is mounted inside freezer 11 and a damper-thermostat 17 for automatically controlling the temperature of cold-storage compartment 12 is mounted inside cold-storage compartment 12. A condenser 18 for cooling and condensing high-temperature and high-pressure gaseous refrigerant into a liquid state is mounted on the rear of the refrigerator. Mounted to the lower rear portion of the refrigerator, a compressor 19 is connected to condenser 18, to adiabatically compress low-temperature and low-pressure gaseous refrigerant into the high-temperature and high-pressure gaseous state. Reference numerals 20 denote foodstuff storage shelves.

In such a conventional refrigerator constructed as above, a microprocessor program is used to maintain three inside temperatures within different ranges (e.g., −12° C. to −24° C. for freezer 11, 0° C. to 7° C. for cold-storage compartment 12 and 5° C. to 10° C. for crisper 13). Each thermostat is electrically connected to a circuit board (not shown) on which the microprocessor is mounted.

In practice, however, the microprocessor can only recognize a temperature change of 0.4°–0.5° C., at best. Therefore, in the case of food sensitive to a minute temperature change, i.e., less than 0.4° C., the food may be degenerated due to a failure in temperature control.

SUMMARY OF THE INVENTION

To overcome the above disadvantages, it is an object of the present invention to provide a temperature controlling method of a refrigerator using a microprocessor, which can optimally maintain a preset refrigeration temperature by precisely and quantitatively controlling the temperature.

To achieve the above object, the temperature controlling method of the refrigerator by using the microprocessor comprises the steps of: sampling digitized temperature values counted by an analog-to-digital converter according to a predetermined temperature range by a predetermined frequency by using the microprocessor; when the number (X') of a temperature value (X) counted with the most frequency is not less than a desired frequency, selecting the temperature value with the most frequency as a controlling temperature; when the number (X') of the temperature value (X) counted with the most frequency is less than the desired frequency, selecting a value obtained by adding/subtracting a predetermined temperature value which is less than the predetermined temperature range to/from the temperature value (X) with the most frequency as the controlling temperature; and selecting a temperature value obtained by applying the steps to at least two temperature values (Y) (Z) counted with the second most frequency and the third most frequency, as the controlling temperature.

According to the temperature controlling method of the present invention, a quantitative sampling is carried out on the temperature value less than the temperature sensing resolution of a microprocessor. A controlling temperature value is then obtained from the sampled value and used for controlling the inner temperature of the refrigerator. Unlike the conventional method, the temperature controlling method of the present invention has an advantage that the inner temperature can be maintained optimally, i.e., such that a refrigerated commodity does not degenerate.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
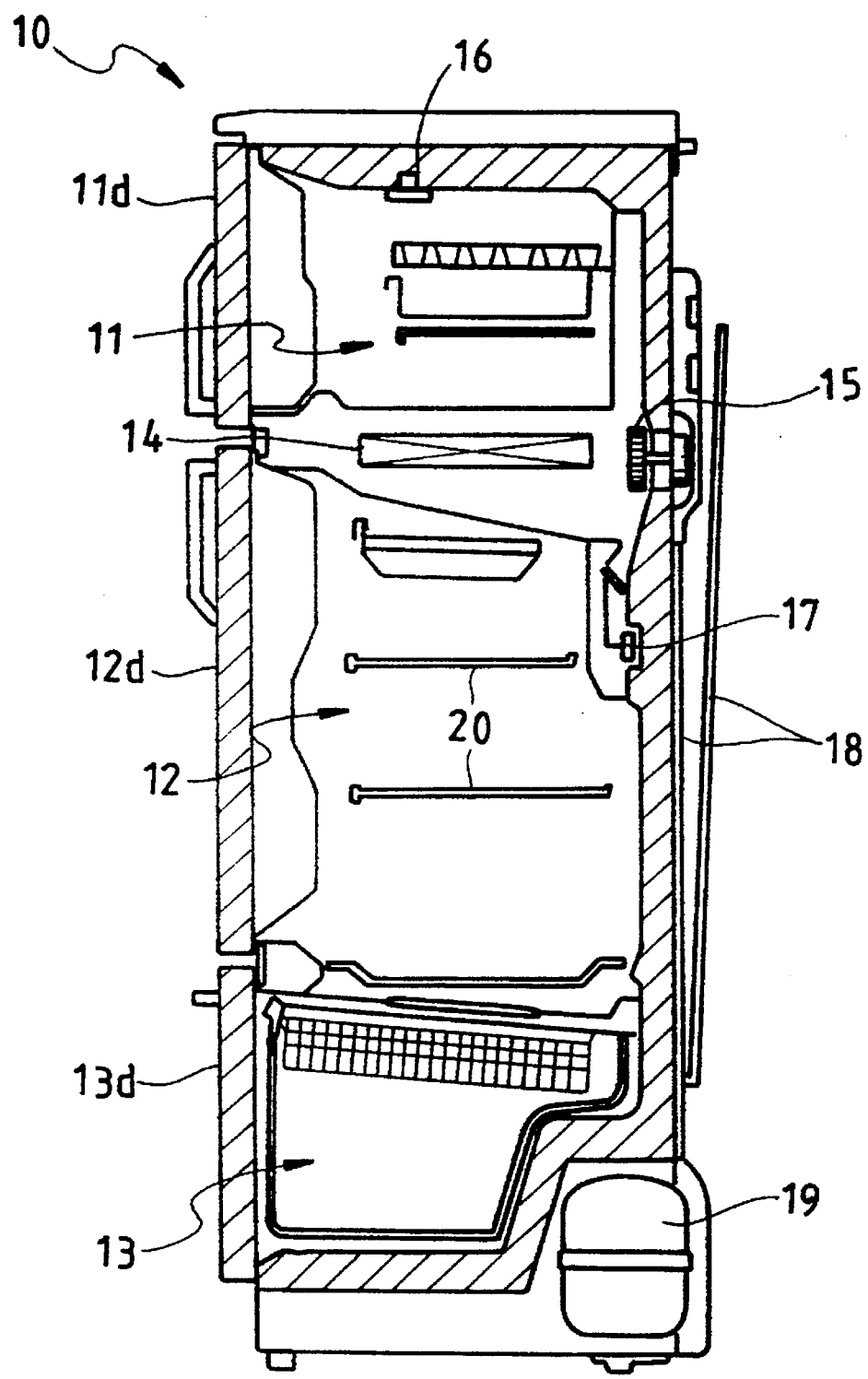
FIG. 1 is a sectional side view showing the interior structure of a conventional refrigerator.
Figure 2:
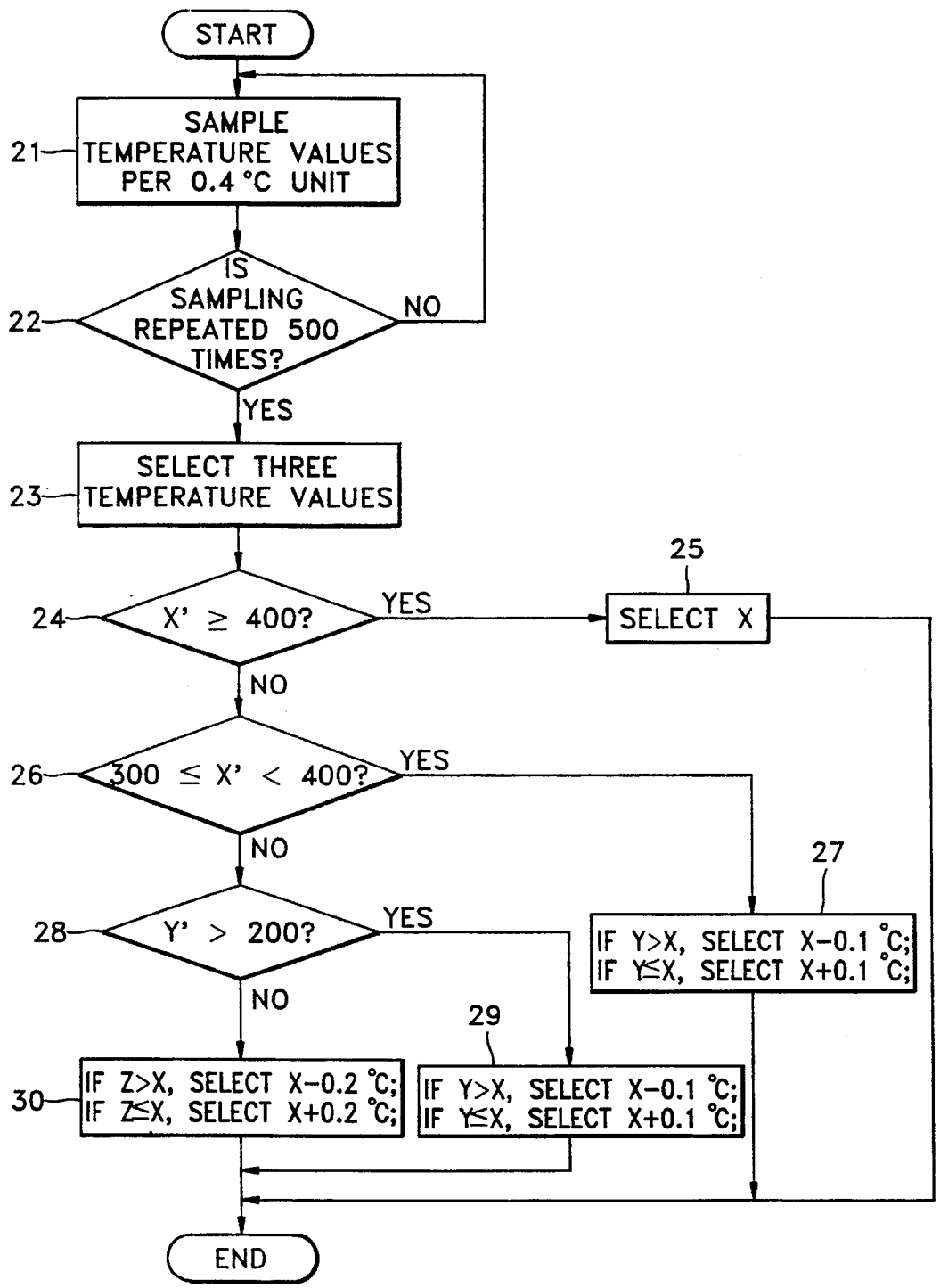
FIG. 2 is a flow chart for explaining a method according to the present invention, for controlling the temperature of a refrigerator using a microprocessor.

Referring to FIG. 2, a temperature controlling method of a refrigerator using a microprocessor according to the present invention will be explained in detail.

In an analog-to-digital converter generally used in the refrigerator, actual temperature sensing resolution which can be recognized by a control unit (microprocessor) is about 0.4°–0.5° C., when supply voltage (Vcc) is +5 V with respect to ground. According to the temperature controlling method of the present invention, temperature change of 0.1° C. can be measured using hysteresis loop between the microprocessor and a sensor.

First, digitized temperature values counted by the analog-to-digital converter per 0.4° C. unit are sampled by using a microprocessor (step 21). Here, since the digitized temperature value is counted per 0.4° C. unit, a temperature value out of the 0.4° C. unit represents as a larger or smaller value than real temperature. Then, it is confirmed whether the sampling is performed by a predetermined frequency (for example, 500 times) with respect to the counted temperature values or not (step 22). If the sampling is performed by the predetermined frequency, i.e., 500 times, a temperature value (referred to as X) counted with the most frequency, a temperature value (refer to as Y) counted with the second most frequency and a temperature value (referred to as Z) counted with the third most frequency are selected (step 23). Thereafter, it is confirmed whether the number (referred to as X') of the temperature X with the most frequency is not less than a desired frequency (for example, 400 times) or not (step 24). If X' is not less than 400 times (X'≧400), the temperature X is determined as a controlling temperature (step 25). If X' is less than 400 times, it is confirmed whether X' is in the range of not less than 300 times and less than 400 times (300≦X'<400) or not (step 26). When 300≦X'<400, if Y>X, a value obtained by X–0.1° C. is determined as a controlling temperature, and if Y≦X, a value obtained by X+0.1° C. is determined as a controlling temperature (step 27). If X'<300, it is confirmed whether the number (referred to as Y') of the temperature Y is more than 200 times or not (step 28). When Y'>200, if Y>X, a value obtained by X–0.1° C. is determined as a controlling temperature, and if Y≦X, a value obtained by X+0.1° C. is determined as a controlling temperature (step 29). When Y'≦200, if Z>X, a value obtained by X–0.2° C. is determined as a controlling temperature and if Z≦X, a value obtained by X+0.2° C. is determined as a controlling temperature (step 30).

According to the temperature controlling method of the present invention, a quantitative sampling is carried out with respect to the temperature value less than resolving power of a microprocessor. A controlling temperature value is then obtained from the sampled value and used for controlling the inner temperature of the refrigerator. Unlike the conventional method, the temperature controlling method of the present invention has an advantage that the inner temperature can be maintained in the optimal condition.

What is claimed is:

1. A temperature controlling method of a refrigerator by using a microprocessor comprises the steps of:

sampling digitized temperature values counted by an analog-to-digital converter according to a predetermined temperature range by a predetermined frequency by using the microprocessor;

when the number (X') of a temperature value (X) counted with the most frequency is not less than a desired frequency, selecting the temperature value with the most frequency as a controlling temperature;

when the number (X') of the temperature value (X) counted with the most frequency is less than said desired frequency, selecting a value obtained by adding/subtracting a predetermined temperature value which is less than said predetermined temperature range to/from said temperature value (X) with the most frequency as the controlling temperature; and selecting a temperature value obtained by applying said steps to at least two temperature values (Y) (Z) counted with the second most frequency and the third most frequency as the controlling temperature.

2. A temperature controlling method of a refrigerator by using a microprocessor as claimed in claim 1, wherein said predetermined temperature range is 0.4° C. and said predetermined temperature value is 0.1° C.

3. A temperature controlling method of a refrigerator by using a microprocessor as claimed in claim 2, wherein, when said temperature value (X) with the most frequency is not less than 300 times and less than 400 times, if said temperature value (Y) with the second most frequency is larger than X, a temperature value obtained by X–0.1° C. is selected as the controlling temperature, and if Y≦X, X+0.1° C. is selected as the controlling temperature.

4. A temperature controlling method of a refrigerator by using a microprocessor as claimed in claim 2, wherein, when said temperature value (X) with the most frequency is less than 300 times and said temperature value (Y) with the second most frequency is more than 200 times, if Y>X, X–0.1° C. is selected as the controlling temperature, and if Y≦X, X+0.1° C. is selected as the controlling temperature.

5. A temperature controlling method of a refrigerator by using a microprocessor as claimed in claim 2, wherein, when said temperature value (X) with the most frequency is less than 300 times and said temperature value (Y) with the second most frequency is not more than 200 times, if said temperature value (Z) with the third most frequency is larger than X, X–0.2° C. is selected as the controlling temperature, and if Z≦X, X+0.2° C. is selected as the controlling temperature.

* * * * *